United States Patent
Figoni et al.

(10) Patent No.: US 11,176,312 B2
(45) Date of Patent: Nov. 16, 2021

(54) MANAGING CONTENT OF AN ONLINE INFORMATION SYSTEM

(71) Applicant: INTERNATIONAL BUSINESS MACHINES CORPORATION, Armonk, NY (US)

(72) Inventors: Matteo Figoni, Rome (IT); Daniele Industriale, Ortona (IT); Patrizia Manganelli, Pomezia (IT); Cristina Bonanni, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/360,078

(22) Filed: Mar. 21, 2019

(65) Prior Publication Data

US 2020/0302002 A1    Sep. 24, 2020

(51) Int. Cl.
| | |
|---|---|
| *G06F 17/00* | (2019.01) |
| *G06F 40/134* | (2020.01) |
| *G06F 16/958* | (2019.01) |
| *G06F 16/93* | (2019.01) |
| *G06F 40/14* | (2020.01) |

(52) U.S. Cl.
CPC .......... *G06F 40/134* (2020.01); *G06F 16/94* (2019.01); *G06F 16/986* (2019.01); *G06F 40/14* (2020.01)

(58) Field of Classification Search
CPC .... G06F 16/9566; G06F 16/986; G06F 16/94; G06F 40/14; G06F 40/134
See application file for complete search history.

(56) References Cited

U.S. PATENT DOCUMENTS

| | | | |
|---|---|---|---|
| 5,941,944 A | 8/1999 | Messerly | |
| 6,748,385 B1 | 6/2004 | Rodkin | |
| 7,426,687 B1 * | 9/2008 | Schultz | G06F 16/9566 715/208 |
| 7,484,178 B2 | 1/2009 | Sholl | |
| 7,689,667 B2 | 3/2010 | Lal | |
| 7,966,310 B2 * | 6/2011 | Sullivan | G06F 16/9566 707/709 |
| 8,028,059 B1 * | 9/2011 | O'Laughlen | G06F 21/604 709/224 |

(Continued)

FOREIGN PATENT DOCUMENTS

| | | |
|---|---|---|
| CN | 100550015 C | 10/2009 |
| GB | 2530507 A | 3/2016 |

OTHER PUBLICATIONS https://themeisle.com/blog/fix-broken-links-in-wordpress/, themeisle, "How to Automatically Find and Fix Broken Links in Wordpress", Sep. 27, 2018, 12 pages.

*Primary Examiner* — Mohammed H Zuberi
(74) *Attorney, Agent, or Firm* — John Noh (57) ABSTRACT

The present disclosure relates to a content management method for managing content of an online information system. The content comprises at least one document. The method comprises: identifying a hyperlink within the document. A replacement hyperlink may be selected from a set of candidate replacement hyperlinks. The candidate replacement hyperlinks refer to replacement documents; wherein selecting the replacement hyperlink is based on comparing metadata associated with the document with metadata associated with the individual replacement documents.

20 Claims, 4 Drawing Sheets

(56) References Cited

U.S. PATENT DOCUMENTS

| | | | |
|---|---|---|---|
| 8,201,081 B2* | 6/2012 | Stroe | G06F 16/9566 715/234 |
| 8,510,411 B2* | 8/2013 | Coulson | H04L 45/745 709/217 |
| 9,690,760 B2* | 6/2017 | Elgebeely | G06F 16/9558 |
| 9,760,632 B2* | 9/2017 | Brundage | G06F 16/9566 |
| 2004/0128273 A1 | 7/2004 | Amitay | |
| 2008/0263193 A1 | 10/2008 | Chalemin | |
| 2009/0043874 A1* | 2/2009 | Kim | G06F 16/9566 709/223 |
| 2009/0164502 A1* | 6/2009 | Dasgupta | G06F 16/9566 |
| 2009/0222717 A1* | 9/2009 | Nelson | G06F 16/9566 715/207 |
| 2012/0016897 A1* | 1/2012 | Tulumbas | G06F 16/9566 707/759 |
| 2012/0137202 A1* | 5/2012 | Nelson | G06F 16/9566 715/205 |
| 2013/0325919 A1* | 12/2013 | Carter | G06F 16/9566 709/201 |
| 2014/0108901 A1 | 4/2014 | Carriero | |
| 2014/0325327 A1 | 10/2014 | Belvin | |
| 2015/0025981 A1* | 1/2015 | Zaretsky | G06Q 30/0277 705/14.73 |
| 2015/0193389 A1* | 7/2015 | Rose | G06F 16/9558 715/208 |
| 2015/0237082 A1* | 8/2015 | Duong | G06F 9/54 715/753 |
| 2015/0281334 A1* | 10/2015 | Ushiki | G06F 16/9577 709/203 |
| 2015/0294022 A1* | 10/2015 | Fan | H04L 67/2861 709/203 |
| 2015/0331947 A1* | 11/2015 | Elgebeely | G06F 16/2365 707/709 |
| 2015/0381653 A1* | 12/2015 | Starink | H04L 63/0281 726/22 |
| 2016/0196314 A1* | 7/2016 | Chakra | G06F 16/951 707/722 |
| 2016/0292207 A1* | 10/2016 | Watanabe | G06F 40/197 |
| 2018/0218085 A1* | 8/2018 | Price | G06Q 30/0251 |
| 2018/0314513 A1* | 11/2018 | DiTullio | G06F 8/65 |

* cited by examiner

MANAGING CONTENT OF AN ONLINE INFORMATION SYSTEM

BACKGROUND

The present invention relates to the field of digital computer systems, and more specifically, to a content management of an online information system.

A hyperlink is a reference to data that the reader can directly follow either by clicking or tapping. A hyperlink points to a whole document or to a specific element within a document. Documents referenced by hyperlinks may, however, be subject to changes and modifications that render them inaccessible.

SUMMARY

Various embodiments provide a content management method, computer system and computer program product as described by the subject matter of the independent claims. Advantageous embodiments are described in the dependent claims. Embodiments of the present invention can be freely combined with each other if they are not mutually exclusive.

An embodiment of the invention provides a content management method for managing content of an online information system. The content comprises at least one document. The method comprises identifying a hyperlink within the document, and selecting a replacement hyperlink from a set of candidate replacement hyperlinks. The candidate replacement hyperlinks refer to replacement documents. Selecting the replacement hyperlink is based on comparing metadata associated with the document with metadata associated with the individual replacement documents.

Another embodiment of the invention provides a computer program product comprising a computer-readable storage medium having computer-readable program code embodied therewith. The computer-readable program code is configured to execute the steps of the method. The computer program product identifies a hyperlink within the document, and selects a replacement hyperlink from a set of candidate replacement hyperlinks. The candidate replacement hyperlinks refer to replacement documents. Selecting the replacement hyperlink is based on comparing metadata associated with the document with metadata associated with the individual replacement documents.

Another embodiment of the invention provides a computer system for managing content of an online information system. The content comprises at least one document. The computer system is configured for identifying a hyperlink within the document, and selecting a replacement hyperlink from a set of candidate replacement hyperlinks. The candidate replacement hyperlinks refer to replacement documents. Selecting the replacement hyperlink is based on comparing metadata associated with the document with metadata associated with the individual replacement documents.

BRIEF DESCRIPTION OF THE SEVERAL VIEWS OF THE DRAWINGS

In the following, embodiments of the invention are explained in greater detail, by way of example only, making reference to the drawings in which.

DETAILED DESCRIPTION

The descriptions of the various embodiments of the present invention will be presented for purposes of illustration, but are not intended to be exhaustive or limited to the embodiments disclosed. Modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Content such as a news or article that is shared on a social network or blog may not be controllable by the administrator of the social network or blog, as that shared content may be managed by third parties. Thus, a change or removal of the content may make it no longer available to those who have shared the content. When trying to access the content an "ERROR Page Not Found", or a similar error, may be displayed on the social or blog page in which it was shared. The present embodiments may enable the administrator to solve such issues independently of who manages the shared content, thus increasing content availability.

An embodiment comprises verifying if a linked document referred to by the hyperlink within the document is accessible. Based on a result of the verifying, the hyperlink can be replaced with the selected replacement hyperlink. For example, if the linked document is not available (e.g. the "error 404" is displayed when clicking on the hyperlink) the hyperlink may be replaced by the available hyperlink. In another example, although the linked document is available, its content may be outdated. In this case, the linked document may be considered to be not accessible, in that its content is outdated. For example, after one year of sharing the linked document, a replacement hyperlink can automatically replace the outdated hyperlink. This embodiment may enable a systematic approach for updating a shared content such as the linked document. The system can reference one or more configuration parameters to determine how often to perform verifications and replacements of linked documents.

According to an embodiment, the method comprises retrieving the linked document referred to by the hyperlink and determining the metadata associated with the linked document. The method determines the set of candidate documents based on at least one of the linked documents or the metadata. For example, the selecting of the replacement hyperlink comprises determining the set of candidate documents. The selecting may be based on the comparison that is performed for the determining of the set of candidate documents.

The metadata of the linked document may comprise keywords indicative of the content of the linked document. The keywords may for example comprise specific html tags such as 'Title', 'Subtitle' and 'Body' and first few lines of the body content. In another example, the keywords may be user defined by selecting html tags or key lines in the linked document.

The keywords may be used as search keys to perform a search of documents that match the linked document by comparing the searched documents with the linked document. The identified searched documents may be the set of candidate documents. For example, the search keys may be sorted according to their weight, from the greater weight to the lower weight, and the search may be carried out through the search engines in the defined order, using the first key because it is more relevant than the other ones. Documents found after using each of the search keys may be the candidate replacement documents. In another example, only documents that are found at least M times when performing the search with more than M search keys (M>=1) are used as candidate replacement documents. The weights may for example be user defined weights.

According to one embodiment, the metadata associated with the document or the replacement document, respectively, comprise at least one of a title, a set of keywords, a brief description, a news topic, or information present, respectively, in the hyperlink or the replacement hyperlink (or present, respectively, in documents referred to by the hyperlink or the replacement hyperlink)

According to one embodiment, the linked document is a HTML document.

According to one embodiment, determining the metadata associated with the document comprises extracting content of at least one predefined HTML element of the HTML document, the predefined HTML element including at least one of a meta tag element or a title element.

Figure 1:
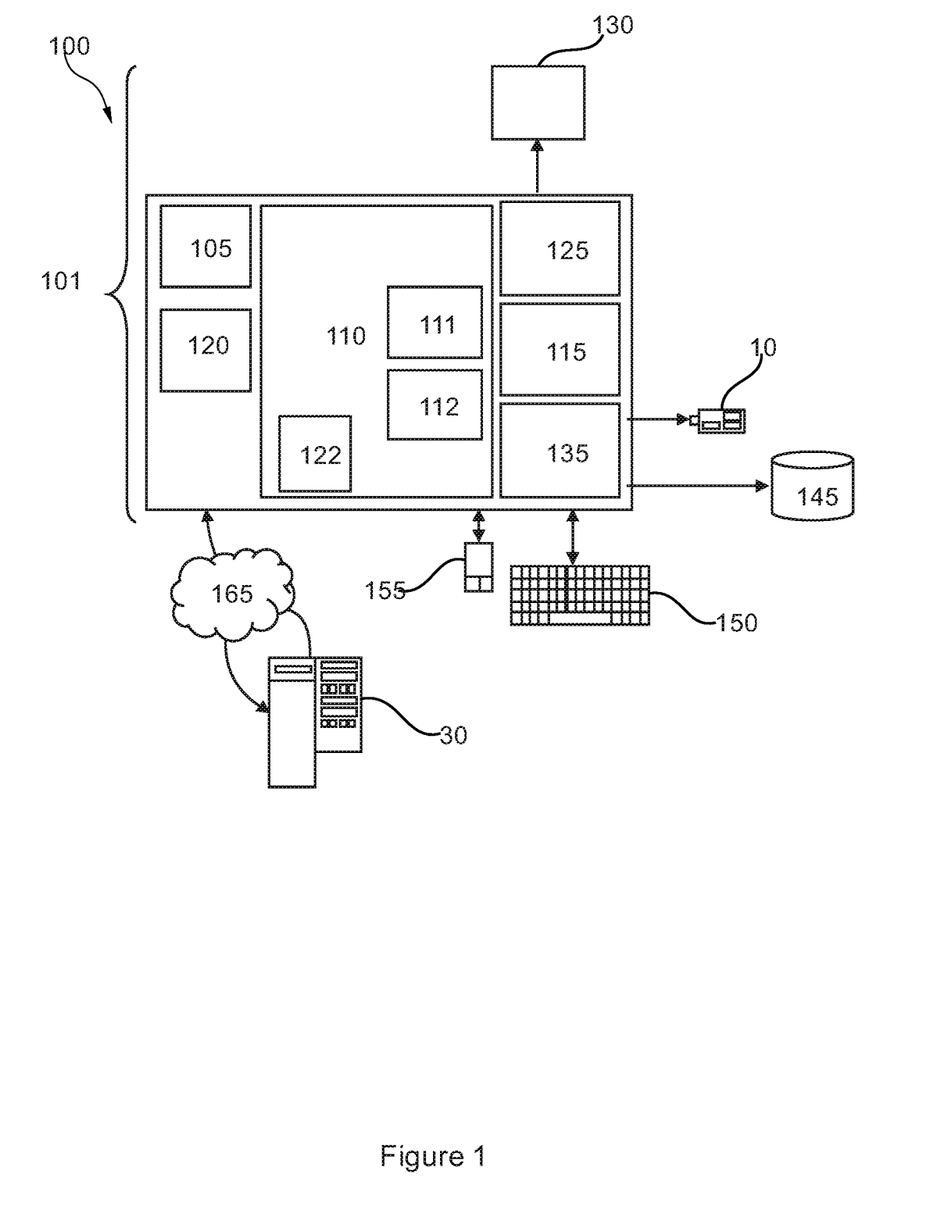
FIG. 1 illustrates a computer system environment, operable for various embodiments of the present disclosure.

FIG. 1 represents a computerized system, suited for implementing various embodiments of the present invention.

It will be appreciated that the embodiments described herein are at least partly non-interactive, and automated by way of computerized systems, such as servers or embedded systems. Exemplary embodiments can be implemented in an interactive system. These embodiments can further be implemented in software 112, 122 (including firmware 122), hardware (processor) 105, or a combination thereof. Exemplary embodiments are implemented in software, as an executable program, and is executed by a digital computer, such as a personal computer, workstation, minicomputer, or mainframe computer. The system 100 therefore includes a computer 101.

In exemplary embodiments, in terms of hardware architecture, as shown in FIG. 1, the computer 101 includes a processor 105, memory (main memory) 110 coupled to a memory controller 115, and one or more input and/or output (I/O) devices (or peripherals) 10, 145 that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 145 may include a cryptographic card or smart card. The processor 105 is a hardware device for executing software, particularly that stored in memory 110. The processor 105 can be any custom made or commercially available processor, a central processing unit (CPU), an auxiliary processor among several processors associated with the computer 101, a semiconductor-based microprocessor (in the form of a microchip or chip set), a macro processor, or any device for executing software instructions.

The memory 110 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). Note that the memory 110 can have a distributed architecture, where various components are situated remote from one another, but can be accessed by the processor 105.

The software in memory 110 may include one or more separate programs, each of which comprises an ordered listing of executable instructions for implementing logical functions, notably functions involved in embodiments of this invention. In the example of FIG. 1, software in the memory 110 includes instructions 112 e.g. instructions to manage databases such as a database management system.

The software in memory 110 shall also typically include a suitable operating system (OS) 111. The OS 111 essentially controls the execution of other computer programs, such as possibly software 112 for implementing embodiments as described herein.

The embodiments described herein may be in the form of a source program 112, executable program 112 (object code), script, or any other entity comprising a set of instructions 112 to be performed. When a source program, then the program needs to be translated via a compiler, assembler, interpreter, or the like, which may or may not be included within the memory 110, so as to operate properly in connection with the OS 111. Furthermore, the embodiments can be written as an object-oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 145 may include input devices, for example but not limited to a printer, a scanner, microphone, and the like. Finally, the I/O devices 10, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 145 can be any cryptographic card or smart card. The system 100 can further include a display controller 125 coupled to a display 130. In exemplary embodiments, the system 100 can further include a network interface for coupling to a network 165. The network 165 can be an IP-based network for communication between the computer 101 and any external server, client and the like via a broadband connection. The network 165 transmits and receives data between the computer 101 and external systems 30, which can be involved to perform part or all of the steps of the embodiments discussed herein. In exemplary embodiments, network 165 can be a managed IP network administered by a service provider. The network 165 may be implemented in a wireless fashion, e.g., using wireless protocols and technologies, such as Wi-Fi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) 122. The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software 112 stored within the memory 110, to communicate data to and from the memory 110, and to generally control operations of the computer 101 pursuant to the software. The embodiments described herein and the OS 111, in whole or in part, but typically the latter, are read by the processor 105, possibly buffered within the processor 105, and then executed.

When the systems and methods described herein are implemented in software 112, as is shown in FIG. 1, the software can be stored on any computer readable medium, such as storage 120, for use by or in connection with any computer related system or method. The storage 120 may comprise a disk storage such as HDD storage.

Figure 2:
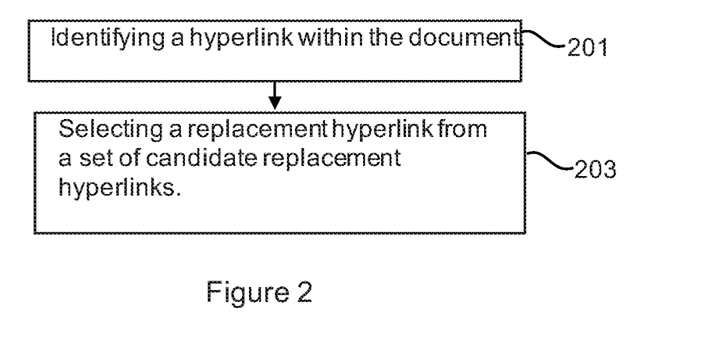
FIG. 2 is a flowchart of an example embodiment for managing content of an online information system.

FIG. 2 is a flowchart of an example embodiment for managing content of an online information system e.g. 100. The content comprises at least one document. The content may be provided by the online information system e.g. the content may be provided by a web page of the online information system.

In step 201, a hyperlink may be identified within the document. This may for example be performed by parsing the document.

In step 203, a replacement hyperlink may be selected from a set of candidate replacement hyperlinks. The set of candidate replacement hyperlinks may be obtained as described with reference to FIG. 3. The candidate replacement hyperlinks refer to replacement documents that may be used to replace the linked document. For example, the replacement hyperlink may be selected based on comparing metadata associated with the document with metadata associated with the individual replacement documents. The comparison may for example comprise the computation of the similarity between the metadata. For example, the searched document that is most similar to the linked document may be selected. The metadata associated with the document or the replacement document, respectively, may comprise at least one of a title, a set of keywords, a brief description, a news topic, or information present, respectively, in the hyperlink or the replacement hyperlink as described with reference to FIG. 3.

Figure 3:
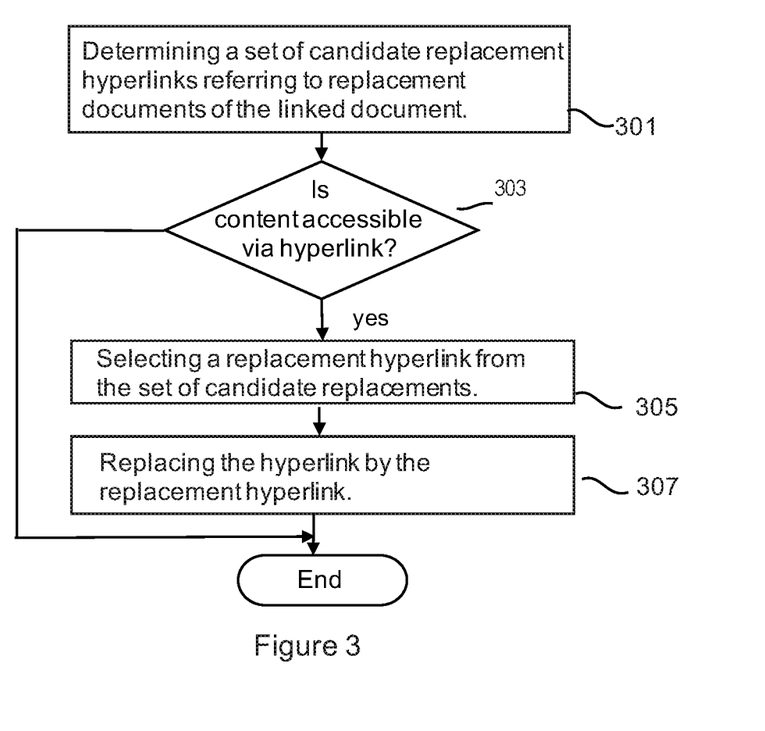
FIG. 3 is a flowchart of another example embodiment for managing content of an online information system.

FIG. 3 is a flowchart of an embodiment for managing content referenced by a hyperlink. The hyperlink may for example be a URL. The hyperlink may for example be part of a document such as an email, pdf document etc. By clicking on the hyperlink, a linked document may be opened and accessed, wherein the linked document has the content to be managed. The linked document may for example be a HTML document. The content of the linked document referred to by the hyperlink may for example comprise a text or news, an image, a photo, etc. The linked content may for example be shared with other parties. The sharing may be performed on a web space, which can be a blog, a web page or a social media.

The linked document may be classified (e.g. in the web) by a set of attributes such as tags, user feedback and comments etc. Additional information may be extracted from a URL of the linked document via cookies, caches, etc. and may be used to classify the linked content. The set of attributes may be provided as metadata of the linked document. For example, the metadata may comprise a list of tags of the HTML document. The tags may comprise keywords of the content. The following list of tags is an example of metadata:

Tag TITLE: <title>Text of the title tag</title>. This tag may be useful as it may attract users' attention in order to read the content.

Tag description: <meta name="description" content="text of the description tag">.

Tag keywords: <meta name="keywords" content="keyword1, keyword2, keyword3">. This is a meta tag that can be used for specifying keywords that can be used when queries are run by search engines. Search engines may limit the indexing of these keywords to a predefined number e.g. first 20 analyzed keywords. The predefined number may be provided by the present embodiment as 10 keywords.

Tag keyword news: <meta name="news_keywords" content="text of the news">. This tag may be used to further specialize the queries made by search engines based on the actual content of the HTML document. Entire phrases or groups of keywords can be specified, separated by commas, and in general it is preferred to specify no more than 10 sentences/groups of words in the HTML document.

In step 301, a set of candidate replacement hyperlinks referring to replacement documents of the linked document may be determined.

For example, a matching or comparison between the set of attributes of the linked document and other searched documents may be performed, resulting in a group of replacement hyperlinks. The group of replacement hyperlinks may for example be ranked based on the similarity of the respective documents with the linked document (e.g. the most similar may be ranked first and so on). The set of candidate replacement hyperlinks may comprise at least part of the group replacement hyperlinks. The at least part of the group may for example be the first N hyperlinks (e.g. N=10).

In another example, the set of candidate replacement hyperlinks may be identified by comparing the set of attribute values of the linked document with searched documents referenced by hyperlinks and identifying the ones that match the linked document. The set of candidate replacement hyperlinks may comprise hyperlinks that reference those matching documents. A searched document is matching the linked document if for example the searched document has attribute values that match the set of attribute values of the linked document. Determining that attribute values are matching comprises: for each attribute of the set of attributes if the difference between the attribute value of the searched document and the attribute value in the linked document is smaller or equal than a predefined threshold, the searched document is matching the linked document with respect to the attribute. A complete matching may be achieved if the attribute values of the searched document match all the set of attribute values of the linked document.

In another example, if a complete matching is not achieved, in that a searched document cannot be found with the same or matching set of attributes of the linked document, a subset of attributes of the attributes may be used. The subset may repeatedly be obtained by excluding one attribute by one from the set of attributes until a searched document that is matching the linked document is found.

In case (inquiry step 303), the content (i.e. the linked document) is not accessible via the hyperlink, a replacement hyperlink may be selected in step 305 from the set of candidate replacement hyperlinks. For example, a first listed or ranked replacement hyperlink (e.g. the first hyperlink may be the link whose document is most similar to the linked document) of the set of candidate replacement hyperlinks may be selected.

In step 307, the hyperlink may be replaced by the replacement hyperlink. For example, if the hyperlink is part of a given document, that given document may be changed such that the hyperlink is replaced by the replacement hyperlink. The selection may for example be performed such that the first ordered and available hyperlink of the list is selected and used for replacing the hyperlink.

For example, the replacement hyperlink may be used to replace the hyperlink in case the linked document of the hyperlink is not available e.g. an error message such as "Error 404 page not found" is displayed in a web page of a user in case the hyperlink is accessed/clicked on. This may enable to replace the linked content with the most similar content in the web space (Blog, web page, Social Network etc.).

Figure 4:
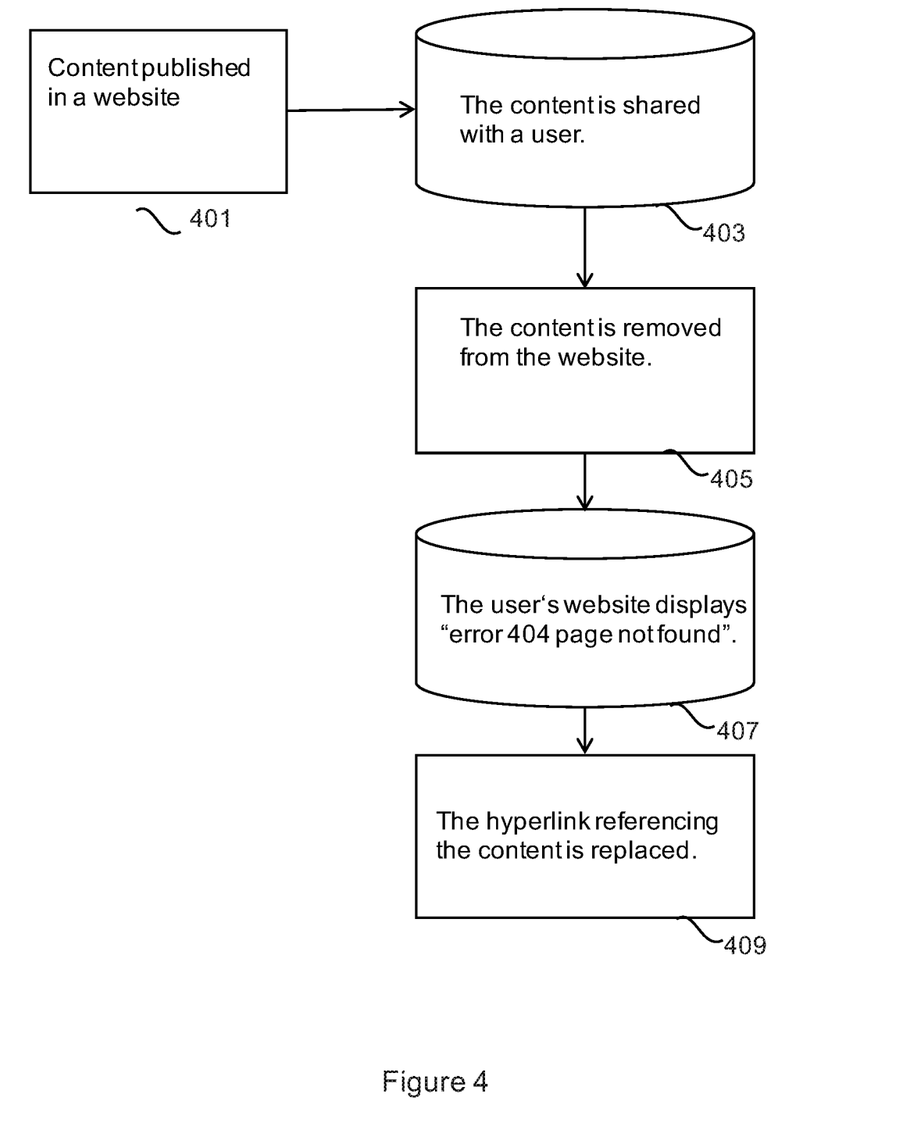
FIG. 4 is a flowchart of an example embodiment for managing a shared content of a website.

FIG. 4 is a flowchart of an embodiment for managing a shared content of a website. The website may be a collection of web pages, including different contents published on at least one web server. For example, in step 401, a given content such as news or technical documentation etc. may be published in the website. The given content may be stored in a respective file in the web server. And a hyperlink such as a URL may be assigned to the given content in order to enable access to the given content via the hyperlink.

The hyperlink may be used in step 403 by one or more users in order to access the given content. The term "user" may refer to an entity e.g., an individual, a computer, or an application executing on a computer that issues network requests for accessing the given content using HTTP and the web server responds with the given content or an error message if unable to do so.

In one example, the hyperlink may be provided as part of a user website of the user. The user may for example use a client browser for enabling access to the hyperlink. The user website may, for example, comprise a blog, personal web page etc. The user web site may be published or hosted by a user web server. In one example, the user web server may be the web server that publishes the given content. This may enable a consistent and autonomous access to resources of the same web server. In another example, the user web server may be different from the web server that publishes the given content. This may enable a consistent access to data in a distributed system.

In another example, the hyperlink may be used in a script. The script may for example be used for continuously monitoring and analyzing the given content. This may for example be advantageous in case the given content changes over time.

In step 405, it may be determined or detected that the shared content via the hyperlink is not accessible anymore. The content may not be accessible due to at least one of the following reasons: the file that contains the given content has been changed, renamed in the web server, deleted, the location of the file is changed, and the lifetime of the file exceeded a predefined maximum usage time period. Thus, the present embodiment may detect at least one of the reasons in order to determine that the given content is not accessible.

For example, in case the content has been removed, e.g. the file is deleted, the web server may return in step 407 an error message (e.g., error code 404) back to the client browser. In another example, in case the given content has expired, a warning message indicating that the content is obsolete may be provided e.g. displayed in step 407.

In response to performing step 407, the hyperlink may be replaced in step 409 by a replacement hyperlink. The replacement hyperlink may be selected from a list of replacement hyperlinks. The list of replacement hyperlinks may be determined as described with reference to FIG. 6. The selection of the replacement hyperlink may for example be performed using a predefined selection criterion. The selection criterion may for example require that the replacement hyperlink is the first available listed hyperlink of the list, that the content referenced by the replacement hyperlink is the most similar to the given content or a randomly selected hyperlink of the list.

Figure 5:
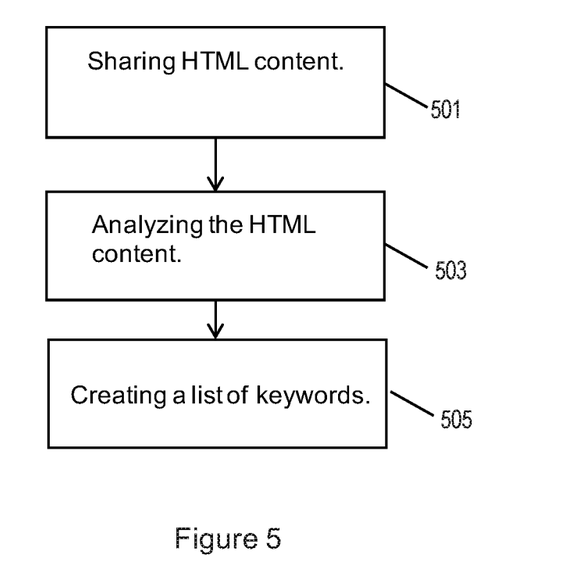
FIG. 5 is a flowchart of an example embodiment for processing a HTML content referenced by a hyperlink.

FIG. 5 is a flowchart of an embodiment for processing a HTML content referenced by a hyperlink. For example, the hyperlink may reference a file or document. The referenced document is a HTML document. The HTML document comprises HTML content. The HTML content comprises a source code that is used by a web browser in order to display the content of the referenced document e.g. the HTML content comprises the content and source code such as HTML tags and elements etc.

The HTML content may, for example, be shared in step 501, as with step 403 e.g. a user may add the hyperlink referencing the HTML content in his blog. The sharing of the HTML content may automatically trigger the analysis of the HTML content in step 503. The analysis of the HTML content may comprise extracting metadata of the HTML content. The metadata may comprise keywords indicative of the HTML content. The keywords may for example comprise specific HTML tags such as 'Title', 'Subtitle', 'body' and first selected lines of the body content. In another example, the keywords may be user defined e.g. by selecting HTML tags or key lines in the linked document. The resulting keywords may be provided as a list of keywords in step 505. The list of keywords may be used for searching replacement documents of the document that comprises the HTML content.

Figure 6:
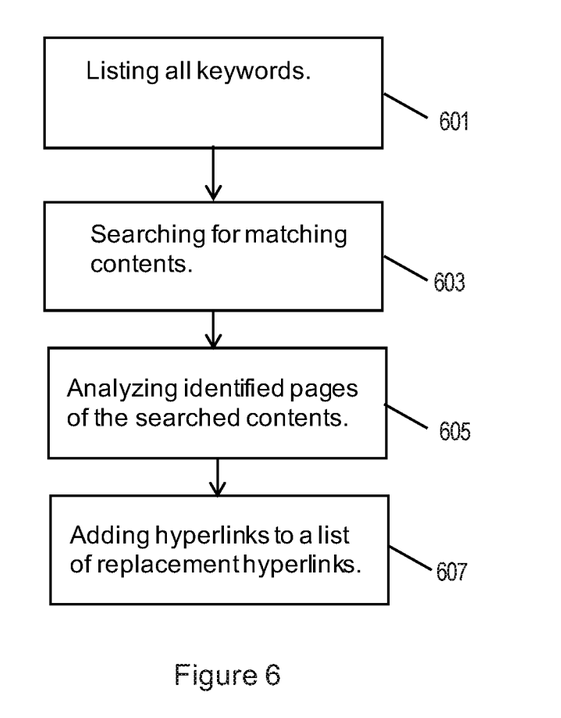
FIG. 6 is a flowchart of an example embodiment for determining a list of replacement hyperlinks of a given hyperlink.

FIG. 6 is a flowchart of an embodiment for determining a list of replacement hyperlinks of a given hyperlink. The given hyperlink may reference a document. The referenced document may for example be a HTML document. The content of the referenced document may be analyzed as described with reference to FIG. 5 in order to obtain the list of keywords that are descriptive of the content of the referenced document. E.g. the list of keywords may comprise one more lines of the content, section names etc.

After listing in step 601 all obtained keywords, candidate replacement documents e.g. web pages, may be searched using the list of keywords (603). The replacement documents may for example be searched using a search engine. The search engine may for example be a web search engine or internet search engine. The search engine may for example search the World Wide Web for at least part of the keywords specified in one or more web search queries. In one example, the search engine may search for candidate replacement documents that comprise all the keywords of the list e.g. each candidate replacement document comprises all the keywords. This may enable an accurate search such that the identified replacement document may be a reliable replacement document. In another example, only part of the keywords may be used for searching the candidate replacement documents. For example, if the list of keywords comprises 10 keywords, 10 different searches may be performed for searching each keyword separately. This may result in a larger number of candidate replacement documents that may need further analysis as described with step 605. In another example, the keywords may be sorted according to their weight, from the greater weight to the lower weight, and the search may be carried out through the search engine in the defined order, using the first keyword because it is more relevant than the other ones. Documents found after using each of the keywords may be the candidate replacement documents. In another example, only documents that are found at least M times when performing the search with more than M keywords (M>=1) are used as candidate replacement documents. The weights may for example be user defined weights e.g. the user may give the highest weight to the keywords of the title tag.

In step 605, the identified candidate replacement documents may be analyzed in order to select or filter the replacement documents that may be used. For example, a similarity analysis may be performed by comparing each of the candidate replacement documents with the document referenced by the given hyperlink resulting in similarity factors. Only the candidate replacement documents whose similarity factors are higher than a predefined threshold may be selected and their hyperlinks may be added to the list of replacement hyperlinks in step 607.

The embodiment of FIG. 6 may for example be performed in response to detecting (e.g. step 405) that the given hyperlink is not available. This may save processing resources that would otherwise be required if the list of replacement hyperlinks is created without the hyperlink becoming unavailable. In another example, the embodiment of FIG. 6 may be performed beforehand e.g. before detecting (e.g. step 405) that the given hyperlink is not available. This may enable a prompt response in case of failures e.g. error code 404.

In summary, embodiments of the present invention improve the resolution of "ERROR Page Not Found" error that occurs when attempting to access a page or a web content that no longer exists. For example, when sharing a news or article on a social or blog, the administrator of the social page or blog, has no control over the content (news in this case) that has shared. That content, being managed from third parties, might change or be removed, making it no longer available to those who have shared it, thus generating error 404 on the social or blog page in which it was shared, causing a problem to the web administrator of such page. Embodiments of the present invention improve the resolution of this error by seeking, suggesting, and substituting a content that is as similar and relevant as possible to the previously shared content.

For example, Content A is classified in the web by attributes such as tags, keywords, user feedback and comments etc. Information can also be extracted from the URL of the shared content via cookies, caches, etc. Embodiments of the present invention attempt a match between the attributes of the Content A (tags, keywords, feedback etc.) with other contents that have the same attributes as Content A. If a complete match is not found, e.g., a new content with the same attributes of Content A, an attempt is made to find a content as close as possible to Content A. The method, system, and computer program product (hereinafter, "system") reiteratively excludes an attribute, beginning with a first attribute of all those of the Content A until a content is found that is as close as possible to Content A. This produces a list of contents (Content C, Content D, Content E, etc.) from which the most inherent content is extracted. Content A is replaced with the most similar content to content A, in the web space (Blog, web page, Social Network etc.). The first content of the list replaces Content A in the web space of the missing Content A, resolving the "Error 404 page not found" issue in the Web page of the user.

The system acts during the sharing phase, after the page to be shared is chosen. The page is analyzed to extrapolate the keywords necessary to identify a list of public pages quite close to the content of the original page. The analysis is performed on the value of specific tags of the page, or that are associated with the page at the time of sharing. In this way the needed search keys to identify the list of alternative pages are obtained. In addition to the original page, the ordered list of alternative pages found is also kept in the sharing phase. When the original page no longer exists, the system replaces the old URL with the first available link contained in the list of pages with similar content. The search keys obtained are sorted according to their weight, from the greater weight to the lower weight, and the search can be carried out through the search engines in the defined order, using the first key, since the first key is more relevant than the other keys.

The found pages are analyzed in the same way of the original page, in order to refine the evaluation of the content. The introspection is based on the textual analysis of the value of specific html tags such as 'Title', 'Subtitle' and 'body' and limited to the first few lines of the body content, assuming that the focus of the news is generally there. In a different embodiment those who share may select keywords or even key lines in the page.

Based on the introspection results, the identified pages can continue to be actually similar and therefore acceptable or different and therefore to be discarded.

The resulting subset of pages can then be associated with the original page.

The HTML document provides a series of tags and keywords whose purpose is to identify the content in a targeted manner. The tags that are considered valid for indexing purposes are:

Title, description, keywords, and news (news_keywords). Tags outside the list are considered to have little influence on the processing of the content of the document to be analyzed. Each of these tags has the same weight for indexing the page (their position will not affect the ranking). These keywords can be specified on each page of the document and each page can have its own set of news_keywords.

Tag TITLE: <title>This is the title</title>

This tag must focus the user's attention in order to read the news, so it is important for the analysis of the contents of our document. It is generally highlighted more than other tags. In addition to the title tag, it is useful to adopt the use of the pipeline (|). It allows separation of different sentences, so that this wildcard can be used to split possible keywords that can consist of whole sentences.

Tag description: <meta name="description" content="description">

This second tag is as important as the title and is used often, for example in search engines. It appears as a description in the boxes below the links to click on.

Tag keywords: <meta name="keywords" content="c1, c2, c3">

It is possible to specify keywords with this meta tag, which is used when queries are run by search engines. If specific words that are also specified in the text of the document are listed as content of this tag, it will determine a higher ranking by search engines. Many engines limit the indexing of these keywords to the first 20 analyzed and, generally, the system uses the first 10 words as the most important of the document. All the pages that compose the document can include keywords (unlike the title and description).

Tag keyword news: <meta name="news_keywords" content="World Cup, Brazil 2014, Spain vs Netherlands"> This tag is useful as it further specializes the queries made by search engines based on the actual content of the article. Entire phrases or groups of keywords can be specified, separated by commas, and in general it is preferred to specify no more than 10 sentences/groups of words per article. These words do not need to appear anywhere within the headline or body text.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for managing content of an online information system, the method comprising:
   identifying a hyperlink within a document;
   determining a set of candidate replacement hyperlinks, the candidate replacement hyperlinks referring to replacement documents, each of the candidate replacement hyperlinks being determined based on comparing metadata indicative of a first classification of content included in the document with metadata indicative of a second classification of content included in each of the replacement documents, the first and second classifications including first and second attribute values, respectively, the determining the set of candidate replacement hyperlinks comprising:
      determining a difference between corresponding ones of the first and second attribute values;
      determining whether at least one of the candidate replacement hyperlinks has second attribute values that completely match corresponding ones of the first attribute values, the first attribute value matching the corresponding one of the second attribute value when the difference is within a predefined threshold; and
      as a result of no complete matches of the first attribute values and the second attribute values, selecting a subset of the first attribute values until the second attribute values of at least one of the candidate replacement hyperlinks completely matches the subset of the first attribute values;
   ranking the candidate replacement hyperlinks based on the comparing the metadata indicative of the first classification with the metadata indicative of the second classification, a first one of the candidate replacement hyperlinks being ranked higher than a second one of the candidate replacement hyperlinks from the first candidate replacement hyperlink having a greater number of first attribute values matching the corresponding ones of the second attribute values than the second candidate replacement hyperlink; and
   selecting a replacement hyperlink from the set of candidate replacement hyperlinks, the replacement hyperlink being a highest ranked one of the candidate replacement hyperlinks.

2. The method of claim 1, wherein the method further comprises:
   verifying if a linked document referred to by the hyperlink within the document is accessible; and
   based on a result of said verifying, replacing the hyperlink with the selected replacement hyperlink.

3. The method of claim 1, wherein the method further comprises:
   retrieving the document referred to by the hyperlink and determining the metadata associated with the document; and
   determining the set of candidate replacement hyperlinks based on at least one of the document or the metadata of the document.

4. The method of claim 1, wherein the metadata associated with the document or the replacement document, respectively, comprise at least one of a title, a set of keywords, a brief description, a news topic, or information present, respectively, in the hyperlink or the replacement hyperlink.

5. The method of claim 1, wherein the document referred to by the hyperlink comprises a HTML document.

6. The method of claim 5, wherein determining the metadata comprises extracting content of at least one predefined HTML element, the predefined HTML element including at least one of a meta tag element or a title element.

7. The method of claim 1, further comprising:
   determining the set of candidate replacement hyperlinks, the candidate replacement hyperlinks referring to replacement documents of the content;
   in response to determining that the content is not accessible via the hyperlink, selecting a replacement hyperlink from the set of candidate replacement hyperlinks; and
   replacing the hyperlink by the replacement hyperlink.

8. The method of claim 1, wherein determining the set of candidate replacement hyperlinks comprises:
   determining metadata indicative of a content; and
   searching replacement documents that match the metadata, resulting in the set of candidate replacement hyperlinks.

9. The method of claim 8, wherein the content is provided in a HTML document.

10. A computer program product comprising a computer-readable storage medium having computer-readable program code embodied therewith, the computer-readable program code when executed on a computer causes the computer to:
   identify a hyperlink within a document;
   determining a set of candidate replacement hyperlinks, the candidate replacement hyperlinks referring to replacement documents, each of the candidate replacement hyperlinks being determined based on comparing metadata indicative of a first classification of content included in the document with metadata indicative of a second classification of content included in each of the replacement documents, the first and second classifications including first and second attribute values, respectively, the determining the set of candidate replacement hyperlinks comprising:
      determining a difference between corresponding ones of the first and second attribute values;
      determining whether at least one of the candidate replacement hyperlinks has second attribute values that completely match corresponding ones of the first attribute values, the first attribute value matching the corresponding one of the second attribute value when the difference is within a predefined threshold; and
      as a result of no complete matches of the first attribute values and the second attribute values, selecting a subset of the first attribute values until the second attribute values of at least one of the candidate replacement hyperlinks completely matches the subset of the first attribute values;

ranking the candidate replacement hyperlinks based on the comparing the metadata indicative of the first classification with the metadata indicative of the second classification, a first one of the candidate replacement hyperlinks being ranked higher than a second one of the candidate replacement hyperlinks from the first candidate replacement hyperlink having a greater number of first attribute values matching the corresponding ones of the second attribute values than the second candidate replacement hyperlink; and selecting a replacement hyperlink from the set of candidate replacement hyperlinks, the replacement hyperlink being a highest ranked one of the candidate replacement hyperlinks.

11. The computer program product of claim 10, further comprising:
verifying if a linked document referred to by the hyperlink within the document is accessible; and
based on a result of said verifying, replacing the hyperlink with the selected replacement hyperlink.

12. The computer program product of claim 10, further comprising:
retrieving the document referred to by the hyperlink and determining the metadata associated with the document; and
determining the set of candidate replacement hyperlinks based on at least one of the document or the metadata of the linked document.

13. The computer program product of claim 10, wherein the metadata associated with the document or the replacement document, respectively, comprise at least one of a title, a set of keywords, a brief description, a news topic, or information present, respectively, in the hyperlink or the replacement hyperlink.

14. The computer program product of claim 10, wherein the document referred to by the hyperlink comprises a HTML document.

15. The computer program product of claim 14, wherein determining the metadata comprises extracting content of at least one predefined HTML element, the predefined HTML element including at least one of a meta tag element or a title element.

16. A computer system comprising:
one or more processors, one or more computer-readable storage devices, and a plurality of program instructions stored on at least one of the one or more storage devices for execution by at least one of the one or more processors, the plurality of program instructions comprising:
identifying a hyperlink within a document;
determining a set of candidate replacement hyperlinks, the candidate replacement hyperlinks referring to replacement documents, each of the candidate replacement hyperlinks being determined based on comparing metadata indicative of a first classification of content included in the document with metadata indicative of a second classification of content included in each of the replacement documents, the first and second classifications including first and second attribute values, respectively, the determining the set of candidate replacement hyperlinks comprising:
determining a difference between corresponding ones of the first and second attribute values;
determining whether at least one of the candidate replacement hyperlinks has second attribute values that completely match corresponding ones of the first attribute values, the first attribute value matching the corresponding one of the second attribute value when the difference is within a predefined threshold; and
as a result of no complete matches of the first attribute values and the second attribute values, selecting a subset of the first attribute values until the second attribute values of at least one of the candidate replacement hyperlinks completely matches the subset of the first attribute values;

ranking the candidate replacement hyperlinks based on the comparing the metadata indicative of the first classification with the metadata indicative of the second classification, a first one of the candidate replacement hyperlinks being ranked higher than a second one of the candidate replacement hyperlinks from the first candidate replacement hyperlink having a greater number of first attribute values matching the corresponding ones of the second attribute values than the second candidate replacement hyperlink; and selecting a replacement hyperlink from the set of candidate replacement hyperlinks, the replacement hyperlink being a highest ranked one of the candidate replacement hyperlinks.

17. The computer system of claim 16, further comprising:
program instructions to verify if a linked document referred to by the hyperlink within the document is accessible; and
based on a result of said verifying, program instructions to replace the hyperlink with the selected replacement hyperlink.

18. The computer system of claim 16, further comprising:
program instructions to retrieve the document referred to by the hyperlink and determine the metadata associated with the document; and
program instructions to determine the set of candidate replacement hyperlinks based on at least one of the document or the metadata of the document.

19. The computer system of claim 16, wherein the metadata associated with the document or the replacement document, respectively, comprise at least one of a title, a set of keywords, a brief description, a news topic, or information present, respectively, in the hyperlink or the replacement hyperlink.

20. The computer system of claim 16, wherein the document referred to by the hyperlink comprises a HTML document; and wherein the program instructions to determine the metadata comprise extracting content of at least one predefined HTML element, the predefined HTML element including at least one of a meta tag element or a title element.

* * * * *